United States Patent
Colotte et al.

(10) Patent No.: US 8,333,546 B2
(45) Date of Patent: Dec. 18, 2012

(54) SYSTEM FOR CONTROLLING AT LEAST TWO VARIABLE-GEOMETRY EQUIPMENTS OF A GAS TURBINE ENGINE, PARTICULARLY BY CAM MECHANISM

(75) Inventors: Baptiste Benoit Colotte, Melun (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 838 days.

(21) Appl. No.: 12/566,325

(22) Filed: Sep. 24, 2009

(65) Prior Publication Data

US 2010/0158663 A1 Jun. 24, 2010

(30) Foreign Application Priority Data

Sep. 30, 2008 (FR) ...................................... 08 56589

(51) Int. Cl.
*F04D 29/56* (2006.01)
(52) U.S. Cl. ....... 415/36; 415/149.4; 415/165; 415/191; 415/211.2; 416/47; 416/104; 416/167
(58) Field of Classification Search ................... 415/36, 415/40, 42, 149.1, 149.2, 149.4, 150, 153.2, 415/165, 191, 211.2; 416/44–47, 103–107, 416/112–116, 154, 167
See application file for complete search history.

(56) References Cited

U.S. PATENT DOCUMENTS

| | | | | |
|---|---|---|---|---|
| 4,461,145 A * | 7/1984 | Stephens | ..................... | 60/226.3 |
| 4,569,199 A * | 2/1986 | Klees et al. | .................. | 60/226.1 |
| 5,259,187 A * | 11/1993 | Dunbar et al. | .................. | 60/204 |
| 7,444,802 B2 * | 11/2008 | Parry | ............................. | 415/160 |
| 7,594,403 B2 * | 9/2009 | Cadieux | ......................... | 60/785 |

FOREIGN PATENT DOCUMENTS

| | | |
|---|---|---|
| EP | 1 398 464 A2 | 3/2004 |
| EP | 1 724 471 A2 | 11/2006 |
| FR | 2 445 439 | 7/1980 |
| FR | 2 633 046 | 12/1989 |
| WO | WO 2007/129937 A1 | 11/2007 |

OTHER PUBLICATIONS

U.S. Appl. No. 13/379,869, filed Dec. 21, 2011, Gaully, et al.
U.S. Appl. No. 13/121,726, filed Mar. 30, 2011, Colotte, et al.
U.S. Appl. No. 13/121,752, filed Mar. 30, 2011, Colotte, et al.
U.S. Appl. No. 13/121,706, filed Mar. 30, 2011, Colotte, et al.
U.S. Appl. No. 12/566,400, filed Sep. 24, 2009, B. Colotte, et al.
U.S. Appl. No. 12/566,211, filed Sep. 24, 2009, B. Colotte, et al.

* cited by examiner

*Primary Examiner* — Igor Kershteyn
(74) *Attorney, Agent, or Firm* — Oblon, Spivak, McClelland, Maier & Neustadt, L.L.P.

(57) ABSTRACT

A system for controlling at least two variable-geometry equipments of a gas turbine engine is disclosed. The engine includes at least a first core rotating at a first speed and a second core rotating at a second speed. The first equipment includes at least one variable-pitch stator blade of a compressor of the first core and the second equipment includes at least one air bleed valve of a compressor of the second engine core moving between an open position at idle speed and a closed position at high speed. The system includes an actuator which actuates both equipments.

10 Claims, 3 Drawing Sheets

SYSTEM FOR CONTROLLING AT LEAST TWO VARIABLE-GEOMETRY EQUIPMENTS OF A GAS TURBINE ENGINE, PARTICULARLY BY CAM MECHANISM

BACKGROUND OF THE INVENTION

The present invention relates to the general field of the control of variable-geometry equipments of a gas turbine engine. The invention more particularly relates to the optimization of the control of several equipments forming part of distinct cores of the engine.

"Variable-geometry equipment" means in this instance an equipment that is connected to a control member and of which the dimension, the shape, the position and/or the speed is or are capable of being modified, according to detected events or defined parameters, in order to act on the operation of the engine. Examples of variable-geometry equipments are air bleed valves (with variable aperture) of a low-pressure compressor, fixed blades of a variable-pitch high-pressure compressor, turbine blades of which the clearance at the tip is variable, variable flow-rate fuel pumps, etc.

"Core" conventionally designates a subassembly of a gas turbine engine comprising as main members a compressor and a turbine assembled on a single shaft. Typically, an engine may comprise a high-pressure core and a low-pressure core. The blades of the compressor and of the turbine of each core are rotated about the axis of the shaft onto which they are mounted.

DESCRIPTION OF THE PRIOR ART

Usually, the various cores of a gas turbine engine are designed to be able to operate independently of one another. Their rotation speeds are independent, even though they can be connected or correlated in certain operating regimes.

Also usually, because of this independence between the various cores of a gas turbine engine, in order to control variable-geometry equipments forming part of different cores, distinct control systems are provided for these distinct equipments. For this reason, controlling two variable-geometry equipments of two distinct cores requires two control circuits, two actuators, two power sources, etc. The result of this is that the weight, the cost and the space requirement of these control systems for the equipments are relatively high. Such a configuration is the one adopted in the European patent application of the applicant published under number EP 1 724 474.

For example, the low-pressure core of a dual-core turbojet may comprise one or more air bleed valves (often designated VBV which is the acronym for "Variable Bleed Valve"), while the high-pressure core may comprise one or more variable pitch stator blade stages (often called VSV, which is the acronym for "Variable Stator Vanes"). In order to reduce the weight of these equipments and their control members, it can be envisaged to install no VBV. Although the saving thus made is significant (the actuators, the servovalves, the pipework, the harnesses, etc. that are associated thereby are removed), the risks induced are considerable, particularly at idle speed if water or hail enters the engine causing an increased risk of stopping the latter.

Patent application FR 2 445 439 by the General Electric Company describes a single means for controlling air bleed valves of a low-pressure stage and of the variable pitch stator stages of a high-pressure stage, but this means controls both equipments in an essentially sequential manner, only the stator blades being actuated during normal operation of the turbomachine (that is to say above the idle speed).

SUMMARY OF THE INVENTION

The object of the invention is to propose a gas turbine engine with variable-geometry equipments belonging to the different cores of the engine and control of these equipments that is optimized.

Thus, the invention relates to a system for controlling at least two variable-geometry equipments of a gas turbine engine, the engine comprising at least a first core rotating at a first speed and a second core rotating at a second speed, the first equipment being a variable-pitch stator blade stage of a compressor of the first core traveling between a closed position at idle speed and an open position at high speed, the second equipment being at least one bleed valve of a compressor of the second core traveling between an open position at idle speed and a closed position at high speed, said system comprising an actuator which actuates both equipments.

By using a single actuator for controlling several (at least two) variable-geometry equipments, the control system makes it possible to reduce the number of parts of the gas turbine engine and thereby achieve the objective of the invention, while retaining said equipments on distinct cores, allowing them thereby to fulfill their function. The weight, the volume and the cost of a second control system are, at least largely, avoided, since the equipments of the first and second cores are actuated by the same actuator.

According to one embodiment, the control system is capable of controlling more than two variable-geometry equipments with the aid of a single actuator.

According to one embodiment, the actuator is controlled by the rotation speed of one of the engine cores. Therefore, the equipment of the other core is controlled by the rotation speed of said core, through the actuator.

In particular, since the engine comprises a low-pressure compressor and a high-pressure compressor, the variable-geometry equipment of the low-pressure compressor is controlled by the rotation speed of the high-pressure compressor. The laws of control of the actuators are therefore simplified.

According to one embodiment, in the case of an engine with a high-pressure core and a low-pressure core, the variable-geometry equipments of the high-pressure core are situated close to the low-pressure core (for example close to the upstream side of the high-pressure core). The mechanical connection between the actuator and the equipments that it controls is therefore made easier.

According to one embodiment, the first variable-geometry equipment comprises at least one variable-pitch stator blade of at least one stator-blade disk, belonging to the high-pressure compressor of a dual-core engine, that is to say an engine with a high-pressure core and a low-pressure core.

According to a particular embodiment in this case, since the engine comprises at least one blade disk comprising a plurality of variable-pitch stator blades, each mounted so as to pivot on a casing of the engine, a control ring surrounding the casing is connected to said blades, for example via levers, the actuator being capable of rotating the control ring, for example by means of an angle transmission member mounted on the casing.

According to one embodiment, the second variable-geometry equipment comprises at least one air bleed valve of the engine. This equipment may comprise one air bleed valve or a plurality of air bleed valves. They are, for example, one or more air bleed valves of the VBV type situated at the low-pressure compressor of a dual-core engine.

The control system of the invention may be adapted to control various types of equipment. In addition to those explained above, the variable-geometry equipments may notably comprise or form an element of one or more of the following devices:

an air bleed valve of the high-pressure compressor with proportional aperture (often called "Transient Bleed Valve" (TBV) or "Start Bleed Valve" (SBV));

an on/off high-pressure compressor air bleed valve (often called "Handling Bleed Valve" (HBV));

an air flow regulation valve contributing to the control of clearance in a low-pressure turbine (often called "Low Pressure Turbine Active Clearance Control" (LP-TACC)), or in a high-pressure turbine (often called "High Pressure Turbine Active Clearance Control" (HP-TACC)).

According to one embodiment, the actuator of the control system comprises at least one movable actuation member the movements of which make it possible to actuate the variable-geometry equipments.

Preferably, the actuator is arranged to actuate the equipments thanks to the variations of a parameter of movement or of position of its movable actuation member. It is therefore possible to define, for each equipment, a law of actuation according to said movement or position parameter (mention will also be made of actuation parameter). The same actuation parameter makes it possible to control a plurality of (at least two) variable-geometry equipments.

More particularly, the actuator is arranged to actuate the first variable-geometry equipment by varying the actuation parameter in a range of actuation of the first equipment and to actuate the second variable-geometry equipment by varying the parameter of actuation in a range of actuation of the second equipment.

According to one embodiment, a means of disengagement is provided between the actuator and at least one of the equipments, said means being arranged to disengage said equipment from the actuator outside the range of actuation of said equipment; therefore, in such a range of the actuation parameter, irrespective of the variations of the parameter, the actuator does not (or not significantly) act on the equipment in question, which is therefore disengaged from the actuator. It is also said that such a range of values of the actuation parameter, in which the actuation member of the actuator is in movement but does not actuate the equipment in question, forms, for said equipment, a "free travel" of the actuation member. The disengagement device makes it possible to reserve a range of values of the actuation parameter solely for controlling the other equipment(s). This is advantageous when the equipment in question must not be affected even when the control of one of the other equipments that are controlled must be able to vary.

According to a particular embodiment, at least one portion of the range of actuation of the first equipment is outside the range of actuation of the second equipment. Control by a single actuator of two variable-geometry equipments may be made easier by the fact that the ranges of actuation of both equipments do not match totally, making it possible, outside the common zone, to actuate one equipment without actuating the other.

According to one embodiment, the ranges of actuation of the first and second equipments comprise a common zone. Therefore, both equipments may be actuated simultaneously in this common zone.

According to another particular embodiment, the ranges of actuation of the first and second equipments are not connected, that is to say that the ranges of actuation of the equipments have no common zone. Therefore, the equipments may be actuated in a sequential manner. Specifically, when the parameter of the actuator in the range of actuation of the first equipment is varied, these variations do not substantially induce any movement on the second equipment, and vice versa.

According to a particular embodiment, the range of actuation of one of the first and second equipments is entirely contained in the range of actuation of the other equipment. In this case, the equipments are actuated simultaneously in their common zone, which may have advantages depending on the nature of the equipment, as seen above; in addition, such an embodiment may make it possible to provide a greater amplitude of actuation for one of the two equipments.

According to a particular embodiment in this case, said range of actuation has an amplitude much smaller than the amplitude of the range of actuation in which it is contained; for example, it may represent less than 20% or less than 10% of this range. In this way, the actuation of the equipment that has the range contained in the other causes only a slight and/or little felt variation of the actuation of the other equipment. Such a configuration may make the control of two equipments easier with a single control system.

According to one embodiment, the control system comprises return means keeping at least one equipment in a predetermined position, at least when the actuation parameter varies in a range situated outside the range of actuation of said equipment. In such a range, this involves ensuring the correct position of the equipment in question.

According to a preferred embodiment of the invention, the actuator comprises a cam mechanism, the cam being arranged to move means for transmitting movement connected to the variable-geometry equipments and therefore to actuate the latter.

According to a preferred embodiment, the cam comprises a peripheral wall the profile of which determines the law for actuating the equipments depending on the angular position of the cam.

According to a preferred embodiment, the means for transmitting movement comprise at least two link rods and means for returning said link rods against the peripheral wall of the cam.

The invention also relates to a gas turbine engine, comprising at least a first core rotating at a first speed and a second core rotating at a second speed, variable-geometry equipments forming part of distinct cores and the control system described above.

BRIEF DESCRIPTION OF THE DRAWINGS

The invention will be better understood with the aid of the following description of the preferred embodiment of the gas turbine engine and of the system of the invention, with reference to the appended drawings, in which.

DESCRIPTION OF THE PREFERRED EMBODIMENTS

Figure 1:
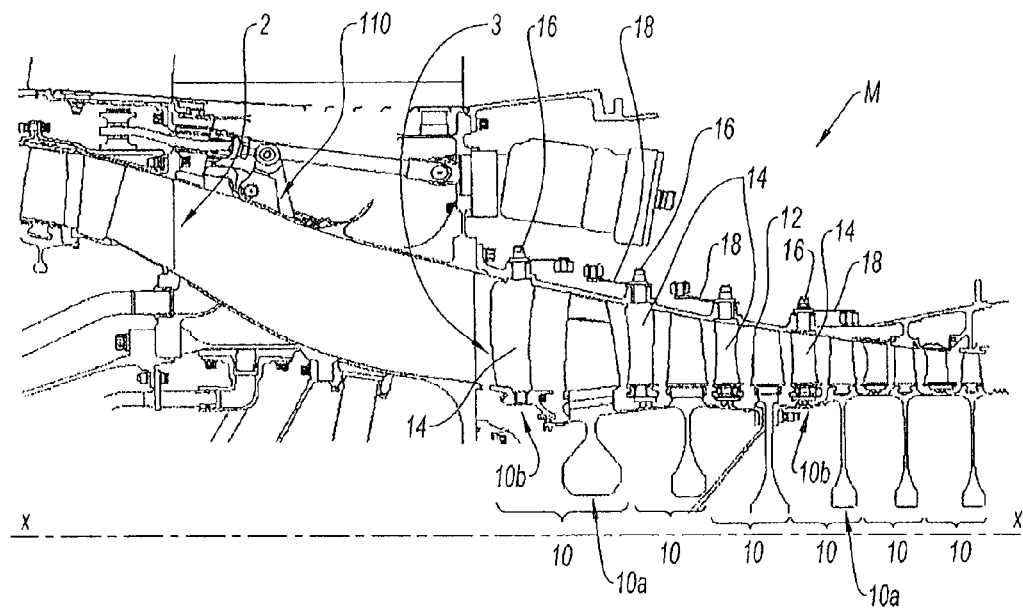
FIG. 1 represents an overview in section of the compressor of a gas turbine engine according to the invention.

In a known manner, a gas turbine engine M, in this instance a dual-core turbojet with an axis X-X comprises, from upstream to downstream, a fan, not shown, a low-pressure compressor 2 (frequently called a "booster" by those skilled in the art), a high-pressure compressor 3, a combustion chamber, a high-pressure turbine, a low-pressure turbine and a nozzle for exhausting the gases (not shown). Hereinafter, the following abbreviations will be used: LP for low pressure and HP for high pressure.

The HP compressor 3 and the HP turbine are attached to a single shaft, called the high-pressure shaft, and therefore belong to the HP core of the engine M, while the LP compressor 2 and the LP turbine are attached to a single shaft, called the low-pressure shaft, and therefore belong to the LP core of the engine M.

The HP compressor 3 comprises at least one stage 10 formed of a disk 10a of movable blades and a disk 10b of fixed blades (also called stator blades). Each disk 10a, 10b is formed of a plurality of blades placed radially about the axis X-X of the engine M. In this instance, the HP compressor 3 comprises a plurality of stages 10, with an alternation of fixed blade disks 10b and movable blade disks 10a. The blades are enveloped by a casing 12 which is centered on the axis X-X of the engine M in the conventional manner.

Of the fixed blade disks 10b, at least the disk 10b of a stage 10 comprises at least one blade 14 called a variable-pitch blade; in this instance, the disk 10b comprises a plurality of such blades 14 and more precisely in this instance the totality of its blades 14 have variable pitch. In this instance, they are "VSV" (for "Variable Stator Vanes") blades 14, already explained above. Each VSV blade 14 is mounted so as to pivot about an axis 16 (or pivot 16) which traverses the casing 12. The angular position of each VSV blade 14 may be adjusted by rotating its pivot 16.

The disk 10b comprising VSV blades 14 belongs to a first variable-geometry equipment, belonging to the HP core. In this instance, the first variable-geometry equipment comprises a plurality of disks 10b of VSV blades 14. The variable parameter of this equipment 10b is the angle of the VSV blades 14 about their pivot 16; in this instance, all the VSV blades 14 of a disk 10b are simultaneously rotated by a ring 22 for controlling (or actuating) the disk 10b of VSV blades 14.

The control ring 22 is of generally circular shape; it surrounds the casing 12 and is centered on the axis X-X of the engine M. The synchronized modification of the angular position of the VSV blades 14 is therefore obtained by rotating the control ring 22 about the axis X-X of the engine, in a known manner.

The engine M comprises a second variable-geometry equipment 110 comprising in this instance at least one air bleed valve 110, in this case a plurality of bleed valves 110. In this particular case they are "VBV" (for "Variable Bleed Valves") valves, already explained above. The variable parameter of such a variable-geometry equipment 110 is the angle of aperture of the VBV valves 110. The VBV valves 110 belong to the LP core 2 of the engine M, that is to say that they are situated at the low-pressure compressor. The function of the VBV valves 110 is to bleed air to the outlet of the LP compressor 2 in order to reduce the risks of malfunction of this compressor 2 when it operates in particular conditions.

The control system 1 is arranged to actuate the VSV blades 14 (first equipment 10b) and the VBV valves 110 (second equipment 110). Accordingly, the control system 1 comprises an actuator 24, in this instance a cam actuation mechanism 24, which is mechanically connected to the first equipment 10b and to the second equipment 110 in order to actuate them, that is to say in this instance in order to control their position by moving them.

Figure 3:
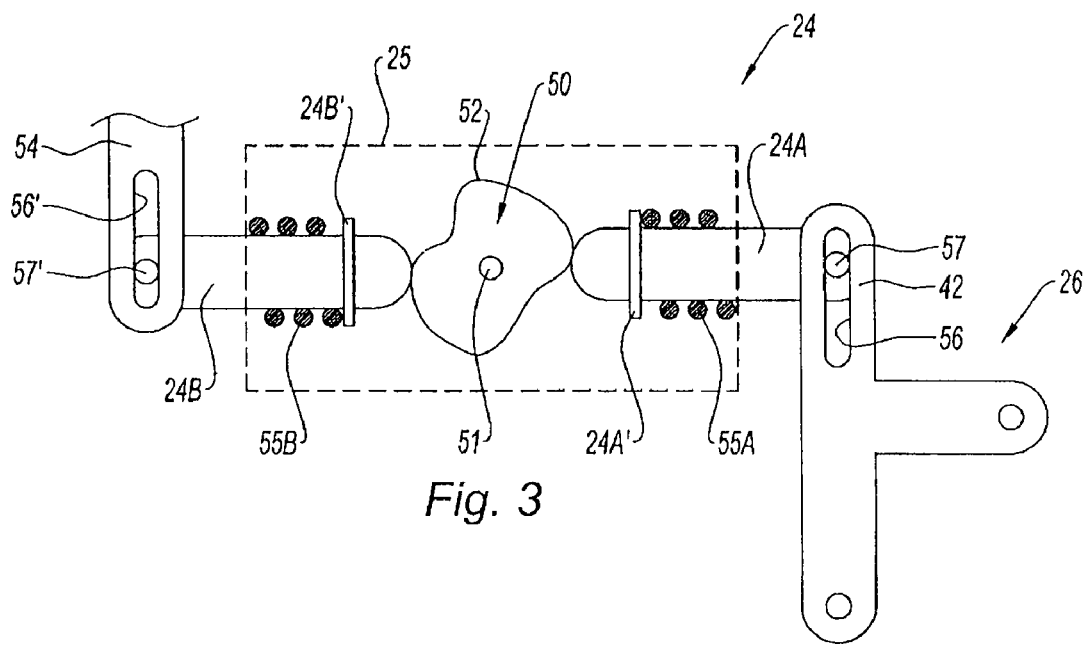
FIG. 3 represents a schematic top view of the actuator of the control system of FIG. 2, in a first actuation position.

The actuator 24 comprises a first link rod 24A, for controlling the position of the VSV blades 14, connected to a mechanism for transmitting movement to the disks 10b of VSV blades 14, and a second link rod 24B, for controlling the position of the VBV valves 110, connected to a mechanism for transmitting movement to the VBV valves 110. The control link rods 24A, 24B fulfill a function of transmitting movement from the actuator 24 to the variable-geometry equipments 10b, 110. With reference to FIG. 3, the actuator 24 comprises a housing 25 in which is mounted a cam 50 for driving the control link rods 24A, 24B; the cam 50 is the member 50 for actuating the actuator 24; the movement parameter of this actuation member 50, making it possible to control the geometry of the equipments 10b, 110 by actuating them, is the angular position of the cam 50. The cam 50 is mounted so as to rotate about a shaft 51. It has a peripheral wall 52 of a particular shape. The free end of each control link rod 24A, 24B is arranged to come into contact on the peripheral wall 52 of the cam 50; accordingly, the free end of each control link rod 24A, 24B is forced in the direction of the cam 50 by a return means 55A, 55B, in this instance a spring 55A, 55B pressing, on the one hand, on a shoulder 24A', 24B', respectively, of the control link rod 24A, 24B, and on the other hand on a wall of the housing 25.

The two link rods 24A, 24B are mounted parallel with one another in an opposed manner relative to the shaft 51 of the cam 50. Each control link rod 24A, 24B is driven in translation relative to the housing 25 by the cam 50, according to the forces applied to it by the peripheral wall 52 of the cam 50 and the springs 55A, 55B. Each control link rod 24A, 24B is forced to move in translation relative to the housing 25. The cam 50 is rotated by adapted drive means, for example an electric motor, a hydraulic motor or a pneumatic motor.

The springs 55A, 55B keep the variable-geometry equipments 10b, 110 in contact with the cam 50, irrespective of the position of the latter. The position of the equipments 10b, 110 is therefore ensured by the shape of the profile of the peripheral wall 52 of the cam 50.

The cam 50 may, for example, be made of a metal material. The contact between the peripheral wall 52 of the cam 50 and the end of the control link rods 24A, 24B may be achieved, for example, by friction or by rolling; in the latter case, rollers are provided at the end of the control link rods 24A, 24B.

Therefore, a single actuator 24 can control two variable-geometry equipments 10b, 110 of two distinct cores of a gas turbine engine, each control link rod 24A, 24B of the actuator 24 being operated by the cam 50 in order to actuate an equipment 10b, 110 via a movement-transmission mechanism.

In the following description, elements that are different but have similar or equivalent shapes and/or functions will be designated by identical reference numbers.

The drive mechanism between the actuator 24 and the VSV blades 14 will be described first of all.

Each pivot 16 of the VSV blades 14 is connected to one end of a link rod 18 or control lever 18 the other end of which is articulated about a trunnion 19 attached to the control ring 22 of the disk 10b in question.

The ring 22 comprises at least one yoke 27 to which is attached one end of a control link rod 32, of the stretching screw type, which extends substantially tangentially to the ring 22. The other end of the control link rod 32 is secured to an angle transmission member 26, 26' mounted so as to pivot on a housing 28 of the casing 12 of the engine M. The angle transmission member 26, 26' is connected to the actuator 24 and therefore transmits the movements from the actuator 24 to the control ring 22.

Figure 2:
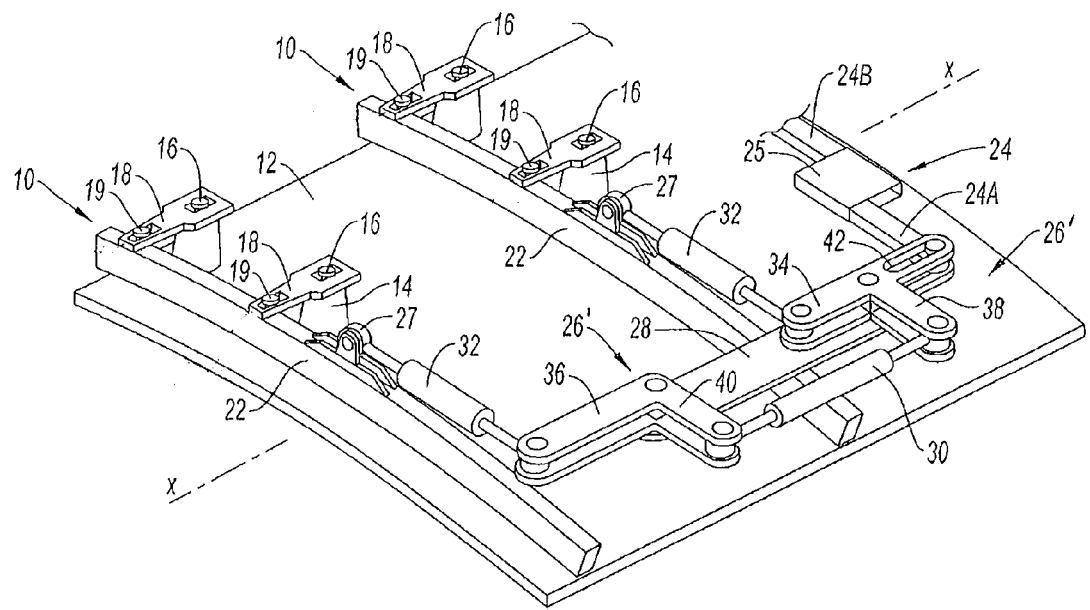
FIG. 2 represents a view in perspective of a portion of the control system according to the invention for the actuation of the VSV blades and of the VBV valves of the engine of FIG. 1.

There are two types of angle transmission members 26: a "leader" angle transmission member 26, which is the angle transmission member 26 directly connected to the actuator 24 and the "follower" angle transmission members 26', which are directly or indirectly connected to the leader angle transmission member 26. In FIG. 2, the leader angle transmission member 26 and a follower angle transmission member 26' are shown; the leader angle transmission member 26 is more precisely T-shaped while the follower angle transmission member 26' is L-shaped.

The control link rod 32 is attached to the end of a first branch 34 of the T, the end of the control link rod 24A of the actuator 24 being attached, in an articulated manner, to the end of the second branch 42 of the T which is in the extension of its first branch 34.

The third branch 38 of the T, perpendicular to the other two, is connected at its end to a bar 30 called the synchronization bar, itself connected to one end of a branch 40 of the follower angle transmission member 26', in a known manner, in order to transmit the movements from the leader angle transmission member 26 to the follower angle transmission member 26'. The other branch 36 of the follower angle transmission member 26' is connected to one end of a control link rod 32 connected to a yoke 27 of the second control ring 22 shown in FIG. 2, to which the transmission of movement takes place in a quite similar manner to the transmission of movement from the leader angle transmission member 26 to the first control ring 22.

The actuator 24 can rotate the control rings 22 of the disks 10b of VSV blades 14 via the leader angle transmission member 26 which transmits the movement from the first control link rod 24A of the actuator 24 to the rings 22. The transmission of movement from a leader angle transmission member 26 to a first ring 22 for controlling VSV blades 14 and to the follower angle transmission members 26' and other rings 22 for controlling VSV blades 14 is known per se by those skilled in the art and does not require more detailed development in the context of the present description.

The mechanism for transmitting movement between the second control link rod 24B of the actuator 24 and the VBV valves 110 will not be described in detail. The second control link rod 24B of the actuator is connected to the VBV valves 110 via a kinematic chain which can easily be defined by those skilled in the art depending upon the various parameters in their possession: the number of VBV valves 110 to be controlled, the distance from the actuator 24 to the VBV valves 110, whether or not a gearing-down of the movement is necessary, etc.

Figure 4:
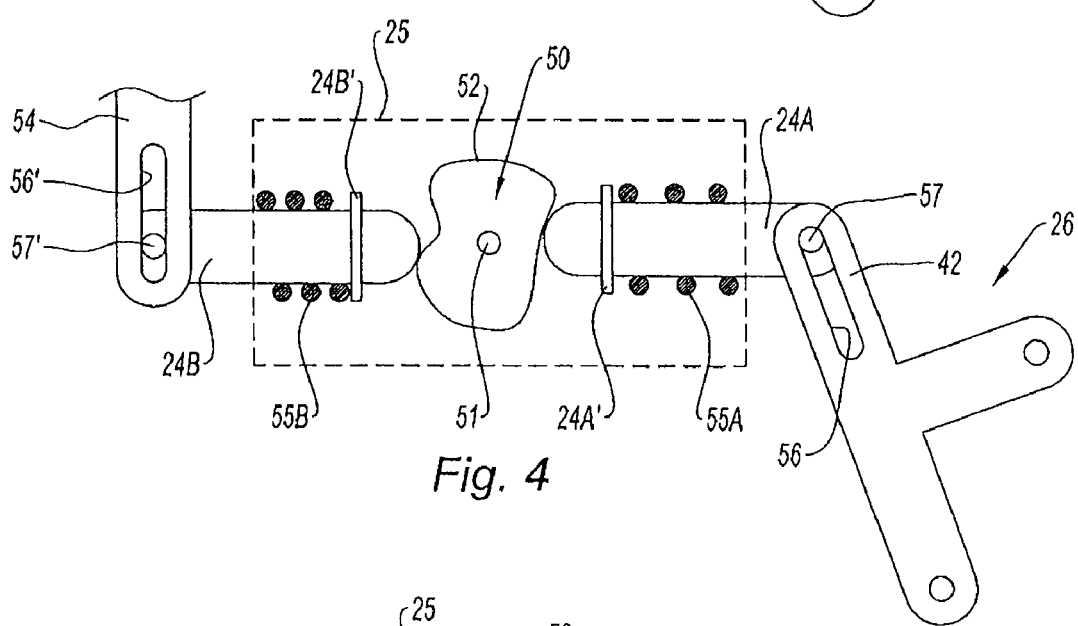
FIG. 4 represents a schematic top view of the actuator of the control system of FIG. 2, in a second actuation position.
Figure 5:
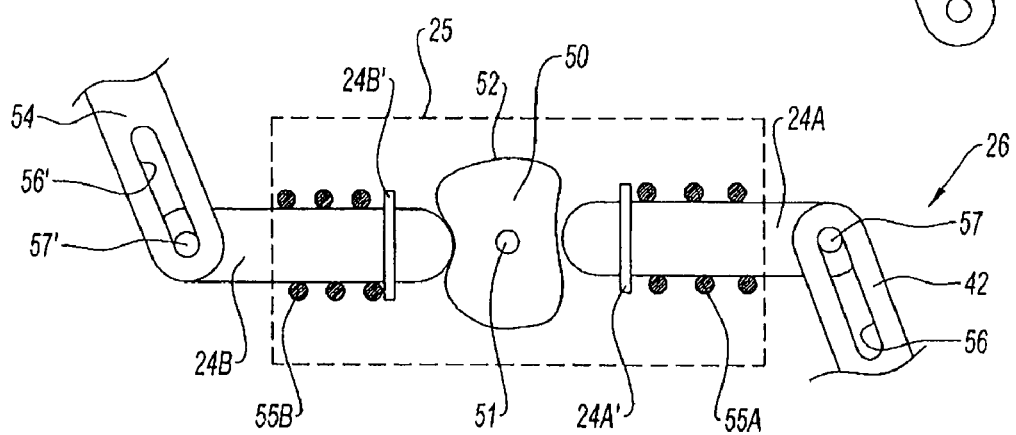
FIG. 5 represents a schematic top view of the actuator of the control system of FIG. 2, in a third actuation position.

In this instance, and with reference to FIGS. 3 to 5, the second control link rod 24B of the actuator, for controlling the VBV valves 110, is connected, via its end protruding out of the housing 25, to the end of a link rod 54 for transmitting movement to the VBV valves 110.

In order to confer upon the various parts of the mechanism for transmitting movement, from the control link rods 24A, 24B to the variable-geometry equipments 10b, 110, the degrees of freedom sufficient for their movements, the parts 42, 54 for transmitting movement to which the control link rods 24A, 24B of the actuator 24 are connected are arranged in order to be able to slide, parallel to their large axis, on the end of the control link rods 24A, 24B. Accordingly, the branch 42 of the leader angle transmission member 26 and the transmission link rod 54 each comprise, close to their end, an oblong hole 56, 56', respectively, arranged in order to interact with a lug 57, 57', respectively, arranged at the end of the corresponding control link rod 24A, 24B. Each pair of an oblong hole 56, 56' and a lug 57, 57' forms a sliding connection between the control link rod 24A, 24B and the part 42, 54 to which it is connected.

Alternatively, in order to offer sufficient degrees of freedom, the housing 25 of the actuator 24 may be mounted so as to pivot on the casing 12 of the engine M, for example about a shaft that is collinear with the shaft 51 of the cam 50 of the actuator 24. The housing 25 can therefore pivot to accompany the translation of the control link rods 24A, 24B which are forced by the movements of the parts to which they are connected.

The operation of the control system 1 will now be described with reference to FIGS. 3 to 6.

Figure 6:
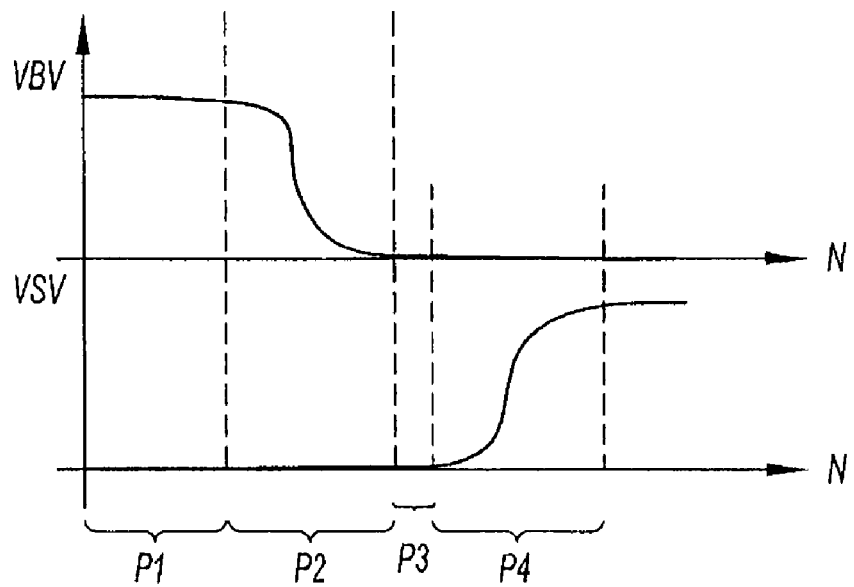
FIGS. 6 and 7 represent the possible laws of aperture of the VSV blades and of the VBV valves of the engine of FIG. 1 according to the rotation speed of its high-pressure core.

FIG. 6 shows the relative opening laws of the VSV blades 14 and of the VBV valves 110 as a function of the speed N of rotation of the HP core. The higher the value of a curve, the more open is the corresponding variable-geometry equipment 10b, 110. The open position of the VSV blades 14 corresponds to the position in which they allow the largest air flow to pass into the HP compressor 3; the open position of the VBV valves 110 corresponds to the position in which they take the maximum air flow rate from the LP compressor 2 (in order to move the operating line of the compressor away from the surge line).

In a first phase P1, corresponding to the lowest speeds N, the geometry of the equipments 10b, 110 remains constant. The VSV blades 14 are then in the closed position while the VBV valves 110 are in the open position.

In a second phase P2, the VBV valves 110 are progressively closed while the VSV blades 14 remain in the open position.

In a third phase P3, the geometry of the equipment 10b, 110 remains substantially unchanged.

In a fourth phase P4, the VSV blades 14 are progressively opened while the VBV valves 110 remain closed.

Therefore, the two variable-geometry equipments 10b, 110 are operated by the speed of the HP core. In particular, the VBV valves 110, belonging to the LP core, are controlled by the rotation speed N of the HP core. The result of this is a simplification of the definition of the laws of opening and guaranteed good synchronization between the openings and closures of the variable-geometry equipments 10b, 110, since these openings and closures depend on the same single parameter: the rotation speed N of the HP core.

It can be seen that, from the fourth phase P4 to the second phase P2, if the curves are followed in the direction of the decreasing speeds N, the VSV blades 14 begin to close before the VBV valves 110 begin to open. Such a sequential actuation of the equipments 10b 110 is possible thanks to the shape of the profile of the peripheral wall 52 of the cam 50, which allows a disengagement of the VBV valves 110 during the actuation of the VSV blades 14, and vice versa.

The law of actuation of the VSV blades 14 and of the VBV valves 110 as a function of the actuation parameter (the angular position of the cam 50), making it possible to obtain the closure of the VSV blades 14 and the opening of the VBV valves 110, will be more specifically described with reference to FIGS. 3 to 5.

In the configuration of FIG. 3, the control link rods 24A, 24B are in position out of the housing 25. In this configuration, the branch 42 of the leader angle transmission member 26 connected to the first control link rod 24A extends perpendicularly to the latter: the VSV blades 14 are in the open position. Moreover, the link rod 54 for transmitting movement to the VBV valves 110 extends perpendicularly to the second control link rod 24B: the VBV valves 110 are in the closed position.

In the configuration of FIG. 4, the cam 50 has been rotated in the counterclockwise direction and the first control link rod 24A, 24B has therefore been driven toward the inside of the housing 25, while, because of the shape of the profile of the peripheral wall 52 of the cam 50, the second control link rod 24B has not substantially moved and has therefore not moved the VBV valves 110. The first control link rod 24A has caused, in its movement, a rotation of the leader angle transmission member 26 and therefore the closure of the VSV blades 14.

In the configuration of FIG. 5, the cam 50 has also been rotated in the counterclockwise direction and the two control link rods 24A, 24B are in their position farthest into the housing 25. Between the configuration of FIG. 4 and the configuration of FIG. 5, the control link rod 24B for controlling the VBV valves 110 has moved in translation relative to the housing 25, moving in its travel the end of the transmission link rod 54; the operation of the transmission link rod 54 causes the VBV valves 110 to open.

As defined above, the range of actuation, for each variable-geometry equipment 10b, 110, corresponds to the range of values of the parameter of the actuation member 50 of the actuator 24, in other words to the angular position of the cam 50 about its shaft 51, for which a movement of the actuation member 50 causes an actuation of the equipment in question 10b, 110. In the embodiment shown in FIGS. 3 to 5, the ranges of actuation of the two equipments 10B, 110 are unconnected, that is to say that they have no common zone; therefore, the opening of the VBV valves 110 begins after the VSV blades 14 finish closing. The precise moment at which the opening of the VBV valves 110 begins during the closure of the VSV blades 14 is defined by the shape of the profile of the peripheral wall 52 of the cam 50; by modifying the shape of this profile, it is possible to obtain different actuation laws, particularly with or without intersection of the ranges of actuation, with one range of actuation included in the other, etc., as explained in the preamble of the description.

Therefore, it is possible to control the opening of the variable-geometry equipments 10b, 110 depending upon the speed N of the HP core. Accordingly, the actuator 24 is controlled by an electronic control unit (not shown). The information on the speed N of the HP core is entered into the control unit which uses this information to control the rotation of the cam 50 and therefore, as explained above, to actuate the variable-geometry equipments 10b, 110 and therefore control their geometry. The profile of the peripheral wall 52 of the cam 50 is therefore a function of the manner in which it is desired to be able to slave the geometry of the equipments 10b, 110 to the speed N of the HP core.

Figure 7:
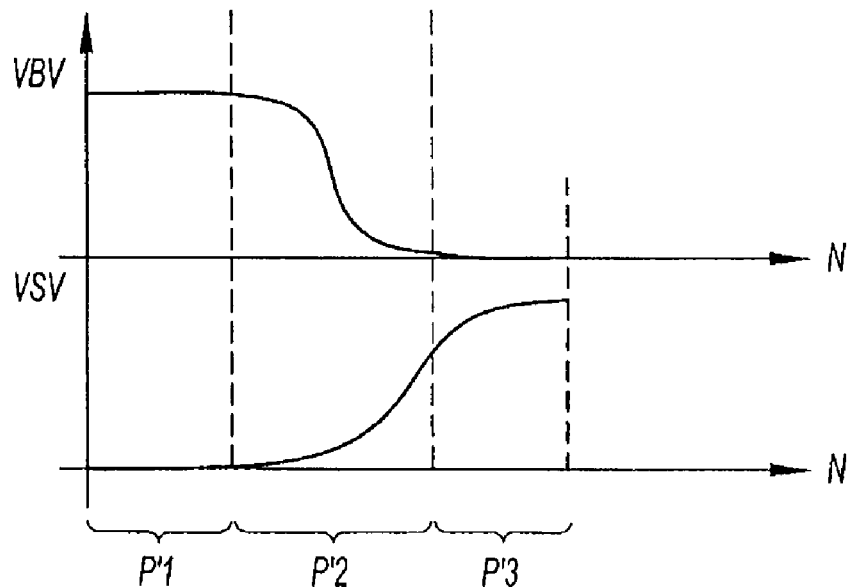

According to an alternative embodiment, as mentioned above, the ranges of actuation of the variable-geometry equipments 10b, 110 intersect. It is therefore possible to apply relative opening laws of the VSV blades 14 and of the VBV valves 110 like those shown in FIG. 7, which will now be described.

In a first phase P'1, at low speed, the VBV valves 110 are open while the VSV blades 14 are closed. In a second phase P'2, at intermediate speed, the VBV valves 110 are progressively closed as the speed N of the HP core increases while the VSV blades 14 are progressively opened as the speed N of the HP core increases; at the end of the second phase P'2, the VBV valves 110 are almost completely closed while the VSV blades 14 are approximately two-thirds open. In a third phase P'3, the closing of the VBV valves 110 is completed while the opening of the VSV blades 14 is progressively completed, as the speed N of the HP core increases.

The invention claimed is:

1. A system for controlling at least two variable-geometry equipments of a gas turbine engine, the engine comprising at least a first core rotating at a first speed and a second core rotating at a second speed, the first equipment comprising at least one variable-pitch stator blade of a compressor of the first core moving between a closed position at idle speed and an open position at high speed, the second equipment comprising at least one compressor air bleed valve of the second engine core traveling between an open position at idle speed and a closed position at high speed, said system comprising:
   an actuator which actuates both equipments,
      wherein the actuator comprises at least one movable actuation member which actuates the variable-geometry equipments, and
      wherein the actuator comprises a cam mechanism, the cam being arranged to move means for transmitting movement connected to the variable-geometry equipments and actuate the variable-geometry equipments.

2. The control system as claimed in claim 1, wherein the actuator is controlled by the rotation speed of one of the engine cores.

3. The control system as claimed in claim 2, wherein the engine comprises a low-pressure core and a high-pressure core, the actuator being controlled by the rotation speed of the high-pressure core.

4. The control system as claimed in claim 1, wherein the first variable-geometry equipment comprises at least one variable-pitch stator blade of a high-pressure compressor of a dual-core engine.

5. The control system as claimed in claim 1, wherein the second variable-geometry equipment comprises at least one air bleed valve of the engine, situated in a low-pressure compressor of a dual-core engine.

6. The control system as claimed in claim 1, wherein, with the actuator being arranged to control the equipments based on variations of a parameter of actuation of its movable actuation member, the actuator is arranged to actuate the first equipment by varying the actuation parameter in a range of actuation of the first equipment and the second equipment by varying the actuation parameter in an actuation range of the second equipment.

7. The control system as claimed in claim 1, wherein a means of disengagement is provided between the actuator and at least one of the equipments, said means being arranged to disengage said equipment from the actuator outside the range of actuation of said equipment.

8. The control system as claimed in claim 1, wherein the cam comprises a peripheral wall the profile of which determines actuation of the equipments depending on the angular position of the cam.

9. The control system as claimed in claim 8, wherein the means for transmitting movement comprise at least two link rods and means for returning said link rods against the peripheral wall of the cam.

10. A gas turbine engine, comprising at least a first core rotating at a first speed and a second core rotating at a second speed, variable-geometry equipments forming part of distinct cores and the control system of one of claim 1-5, 6-8, or 8-9.

* * * * *